June 23, 1925.
E. J. CARPENTER
FISHING DEVICE
Filed Feb. 18, 1925
1,543,247
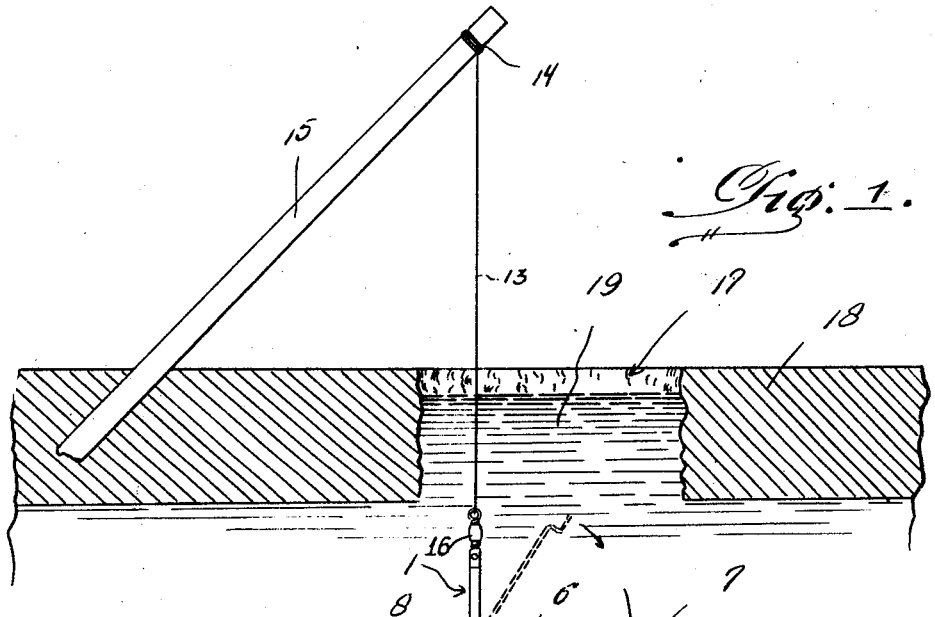
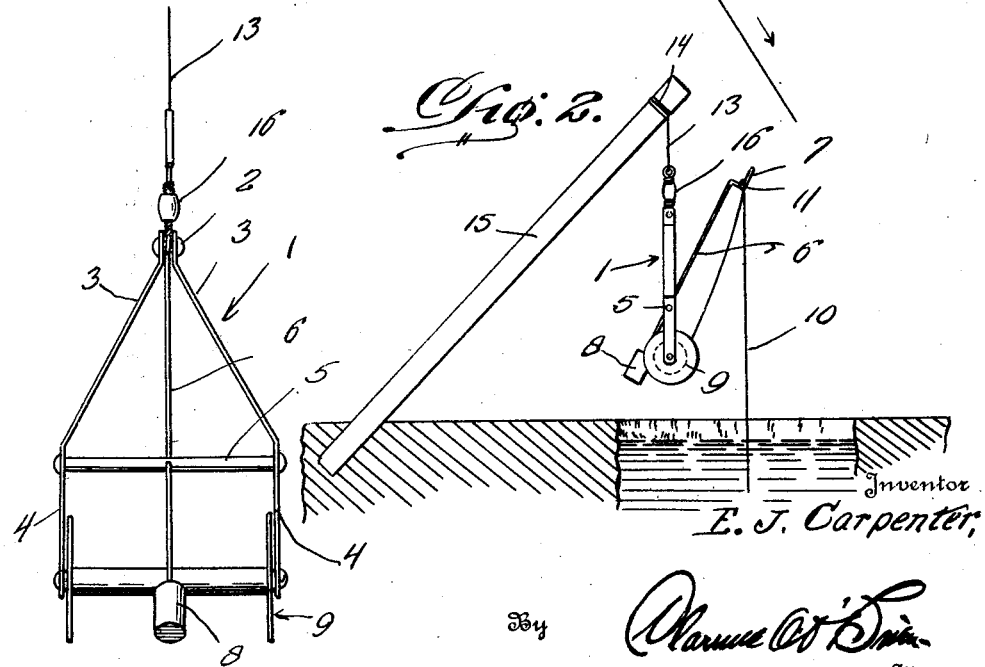
Inventor
E. J. Carpenter,
By
Clarence O'Brien
Attorney Patented June 23, 1925.

1,543,247

UNITED STATES PATENT OFFICE.

EDWARD J. CARPENTER, OF PORT EWEN, NEW YORK.

FISHING DEVICE.

Application filed February 18, 1925. Serial No. 10,072.

*To all whom it may concern:*

Be it known that I, EDWARD J. CARPENTER, a citizen of the United States, residing at Port Ewen, in the county of Ulster and State of New York, have invented certain new and useful Improvements in a Fishing Device, of which the following is a specification.

This invention relates to an improved device for catching fish in cold weather and especially in ice covered bodies of water.

The invention has more particular reference to a fishing device which embodies a signalling device which is actuated by the fish as soon as the catch is made, whereby to notify the fisherman that a fish is on the line.

The principal object is to generally improve upon devices of this class by providing one of comparative simplicity and durability which is practical, positive in operation, and such as to prevent the accidental display of a false signal.

Other features and advantages of the invention will become apparent from the following description and drawing.

In the accompanying drawing forming a part of this application and in which like numerals are employed to designate like parts throughout the same;

Figure 1 is a side elevation of a fishing device constructed in accordance with the present invention showing the same in use with the line, reel and other details immersed in the water.

Fig. 2 is a corresponding view showing the details suspended above the water and coating of ice.

Fig. 3 is an enlarged elevational view of the main details of the device.

Referring to the drawings in detail it will be seen that the device comprises a suitably shaped frame 1 (see Fig. 3) which in the present instance comprises a pair of opposed side bars connected together at their upper ends as indicated at 2, diverging downwardly as at 3 and disposed in spaced parallelism at the lower ends as at 4.

At the juncture of the inclined and vertical portions are openings which constitute bearings for a rock shaft 5 carrying a rod 6. As seen in side elevation, the upper end of the wire rod 6 is formed into a hook 7 and a counterbalance weight 8 is detachably screwed on the lower end thereof, it being the normal tendency of the weight to swing the rod to inclined dotted line position shown in Fig. 1.

Rotatably mounted between the free ends of the side bars is a reel 9 upon which the fishing line 10 is adapted to be wound. It will be noted from Figs. 1 and 2 that the fishing line is provided with a loop 11 which is adapted to be engaged over the hook 7 on said rod 6. Just beyond the loop a light cloth or the like 12 is fastened to the line. On the free end of the line the usual hook and sinker (not shown) are fastened.

A suspension cable or the like 13 is employed, the same being wrapped at its upper end in a groove 14 formed at the top of an inclined pole 15. The frame 1 is connected to the cable 13 through the medium of an appropriate swivel connector 16.

In practice, a hole 17 is cut into the ice 18 to expose the water 19. In exceedingly cold or freezing weather, the frame, reel and the cooperating details including the fishing line are lowered through the hole 17 in the ice and suspended in operative position by the inclined pole 15, the lower end of which is driven into the ice. With the device immersed in the water, the freezing weather will not interfere with its operation.

In non-freezing weather, however, the device is preferably suspended by the cable 13 at a point above the surface of the ice as indicated in Fig. 2. In use, the hook is baited in the usual way and when the bait is swallowed and a pull is exerted upon the fishing line 10, it is obvious that the rod 6 will be swung downwardly upon its pivot and against the action of the counterbalance weight 8, to the approximate horizontal position indicated in Fig. 1, at which time the loop 11 will be disconnected from the hook 7 and the line will pay out by the unwinding reel.

The fisherman being unable to see the cloth 12 adjacent the surface of the water, will upon observation, note that a catch has been made. It is thought that the foregoing description when taken in connection with the accompanying drawings will enable persons skilled in the art to which the invention relates to obtain a clear understanding of the same. Therefore a more lengthy description is deemed unnecessary.

Although the foregoing description sets forth the particular embodiment of the invention, it is to be understood that minor changes coming within the scope of the invention claimed may be resorted to if desired.

Having thus described my invention, what I claim as new is:—

1. A fishing device of the class described comprising a supporting member, a suspension cable connected to said member, a frame carried by said suspension member, a reel carried by said frame, a signalling member, a fishing line wound upon said reel, said signalling member being carried by said line, and a counterbalanced weighted rod mounted upon said frame and serving to maintain said signalling member in a readily visible position.

2. A fishing device of the class described comprising a supporting pole, a suspension cable connected to said pole, a frame on the lower end of said cable, a fishing line reel carried by said frame, a line wound upon said reel, said line being provided with a loop, a counterbalanced and weighted rod pivotally mounted upon said frame, said line being normally connected with said rod, and a signalling element carried by said line.

3. In a structure of the class described, a frame embodying spaced side bars, a rock shaft pivotally mounted between said bars, a rod carried by said rock shaft, said rod being formed at its upper end with a hook, a weight on the opposite end of said rod, and a fishing line reel journaled for rotation between said side bars.

In testimony whereof I affix my signature.

EDWARD J. CARPENTER.